US009317526B1

(12) United States Patent
Klein

(10) Patent No.: US 9,317,526 B1
(45) Date of Patent: Apr. 19, 2016

(54) DATA PROTECTION COMPLIANT VERSION CONTROL

(71) Applicant: Udo Klein, Walldorf (DE)

(72) Inventor: Udo Klein, Walldorf (DE)

(73) Assignee: SAP SE, Walldorf (DE)

(*) Notice: Subject to any disclaimer, the term of this patent is extended or adjusted under 35 U.S.C. 154(b) by 21 days.

(21) Appl. No.: 14/537,990

(22) Filed: Nov. 11, 2014

(51) Int. Cl.
*G06F 17/30* (2006.01)
*H04L 9/08* (2006.01)

(52) U.S. Cl.
CPC .......... *G06F 17/3023* (2013.01); *H04L 9/0816* (2013.01); *H04L 9/0891* (2013.01)

(58) Field of Classification Search
CPC .. G06F 17/3023; H04L 9/0816; H04L 9/0891
See application file for complete search history.

(56) References Cited

U.S. PATENT DOCUMENTS

| 5,974,427 | A  | * | 10/1999 | Reiter | G06F 17/30356 |
| 2005/0008163 | A1 | * | 1/2005 | Leser | H04L 9/08 380/281 |
| 2014/0222758 | A1 | * | 8/2014 | March | G06F 17/3023 707/638 |

OTHER PUBLICATIONS

"GitHub Help: Why are my contributions not showing up on my profile?", (retrieved from Web Archive with date Apr. 20, 2013, 2 pages)by GitHub Help.*
Sullivan, "Making Sense of Revision-Control Systems", (Sep. 2009, vol. 52, No. 9, Communications of the ACM, pp. 57-62).*

* cited by examiner

*Primary Examiner* — Saleh Najjar
*Assistant Examiner* — Oleg Korsak

(57) ABSTRACT

In a data protection compliant version control system, a change committed by a user in a version is stored. A cryptographic hash value generated based on a set of parameters corresponding to the user and the version is computed. The cryptographic hash value along with the change committed by the user is stored. The cryptographic hash value is associated with the change committed by the user by a redirection pointer. The redirection pointer is deleted to disassociate the change committed by the user from the cryptographic hash value, thereby disassociating the change committed by the user from the user. The change committed by the user is displayed in a user interface associated with the version control system.

20 Claims, 9 Drawing Sheets

DATA PROTECTION COMPLIANT VERSION CONTROL

BACKGROUND

Enterprises use version control systems to manage changes to documents, software programs, etc. A version control system is used to manage changes by tracking a time of change and a user responsible for the change in a version repository. The version control systems can be audited and the changes to version repositories cannot be cancelled or wiped once they are committed. In some jurisdictions there may be a legal requirement that in the version control systems, the information regarding the users responsible for the change needs to be deleted while retaining the changes. Typically overwriting or selective deletion of references to users is not possible in version repositories. It is also a challenge to selectively delete s user responsible for s change while not tampering the details of user responsible for the change in the version control systems.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques for data protection compliant version control are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
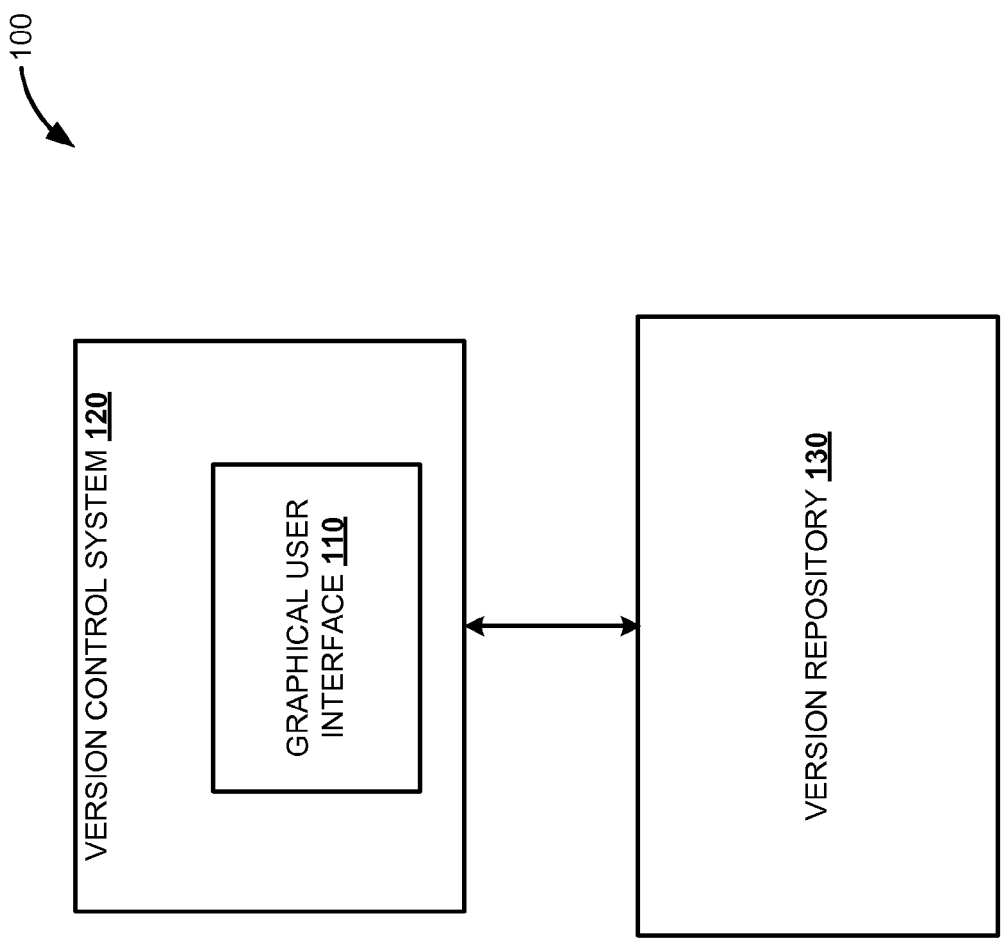
FIG. 1 is a block diagram illustrating an example environment for a data protection compliant version control system, according to one embodiment.

FIG. 1 is a block diagram illustrating example environment 100 for data protection compliant version control system, according to one embodiment. The environment 100 as shown contains graphical user interface 110 associated with version control system 120 and version repository 130. Merely for illustration, only representative number and types of systems and system modules are shown in FIG. 1. Other environments may contain more instances of version control systems and version control repositories, both in number and type, depending on the purpose for which the environment is designed.

Version control system 120 is an application that may be a stand-alone application or may be embedded in other software applications. The graphical user interface 110 associated with the version control system 120 enables a user to interact with the version control system 120. Version control system 120 enables tracking and managing changes to documents, software codes, etc. Initially when a document or software code is created and committed or saved, the document or code gets saved or persisted in version repository 130 as a first version identified, e.g., by a unique numeral along with a time stamp. Commit is referred to as persisting changes permanently in the version repository 130. When subsequent changes are made to the document or software code, the changes made to the document or software code may be committed to the version repository 130 as a revision identified by another unique numeral along with a new timestamp.

The connectivity between the version control system 120 and the version repository 130 may be implemented using any standard protocols such as Transmission Control Protocol (TCP) and/or Internet Protocol (IP), etc. The version control system 120 can be executed as an installed stand-alone application or web application on any browser in desktops.

Figure 2:
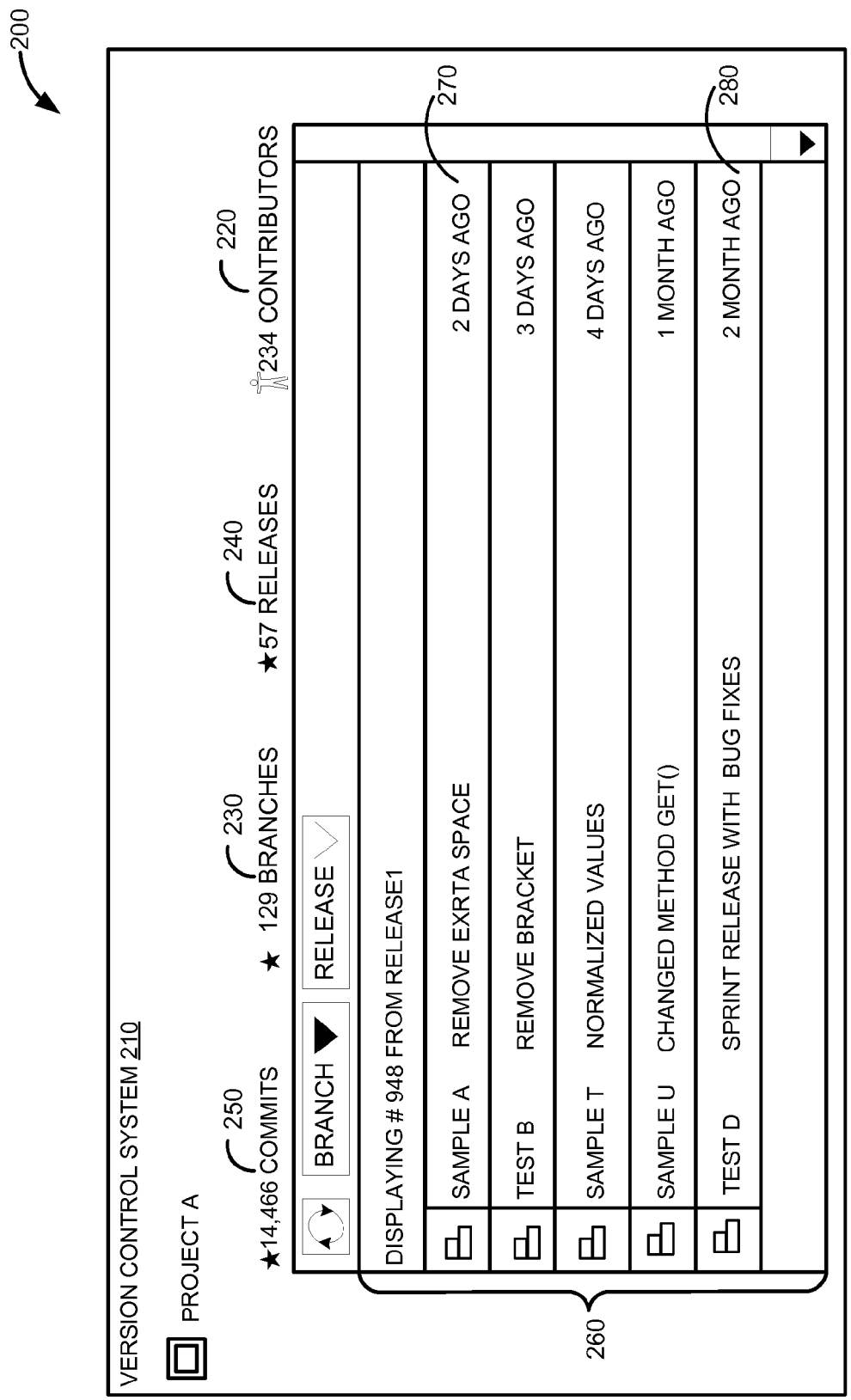
FIG. 2 shows a graphical user interface associated with version control system, according to one embodiment.

FIG. 2 shows graphical user interface 200 associated with version control system 210, according to one embodiment. Version control system 210 is used to track and manage changes to projects, e.g., 'project A'. 'Project A' has two hundred and thirty four users working on it and that is shown as '234 contributors' in 220. Development of 'project A' is performed in various branches, where the independent branches allow the contributors to work in parallel. Branches allow contributors to isolate changes and work on changes such as bug fixes, new feature additions, etc., without destabilizing the 'project A'. Number of branches in 'Project A' is shown as '129 branches' in 230. 'Project A' is released at various stages of development and maturity. A release is referred to as a stage of software code or software development completion where the contributors agree that no more new code will be added to this release. Number of releases in 'Project A' is shown as '57 releases' in 240. Total number of commits in 'project A' by '234 contributors' is 14,466 commits as shown in 250. The number of changes committed by various contributors in various modules of 'release1' is '948' as displayed in table 260. For example, in module 'sample A' of 'project A', the last change committed is 'remove extra space' performed 2 days ago as shown in row 270 of table 260. Similarly, in module 'test D' the last change committed is 'sprint release with bug fixes' performed 2 month ago as shown in row 280.

Figure 3:
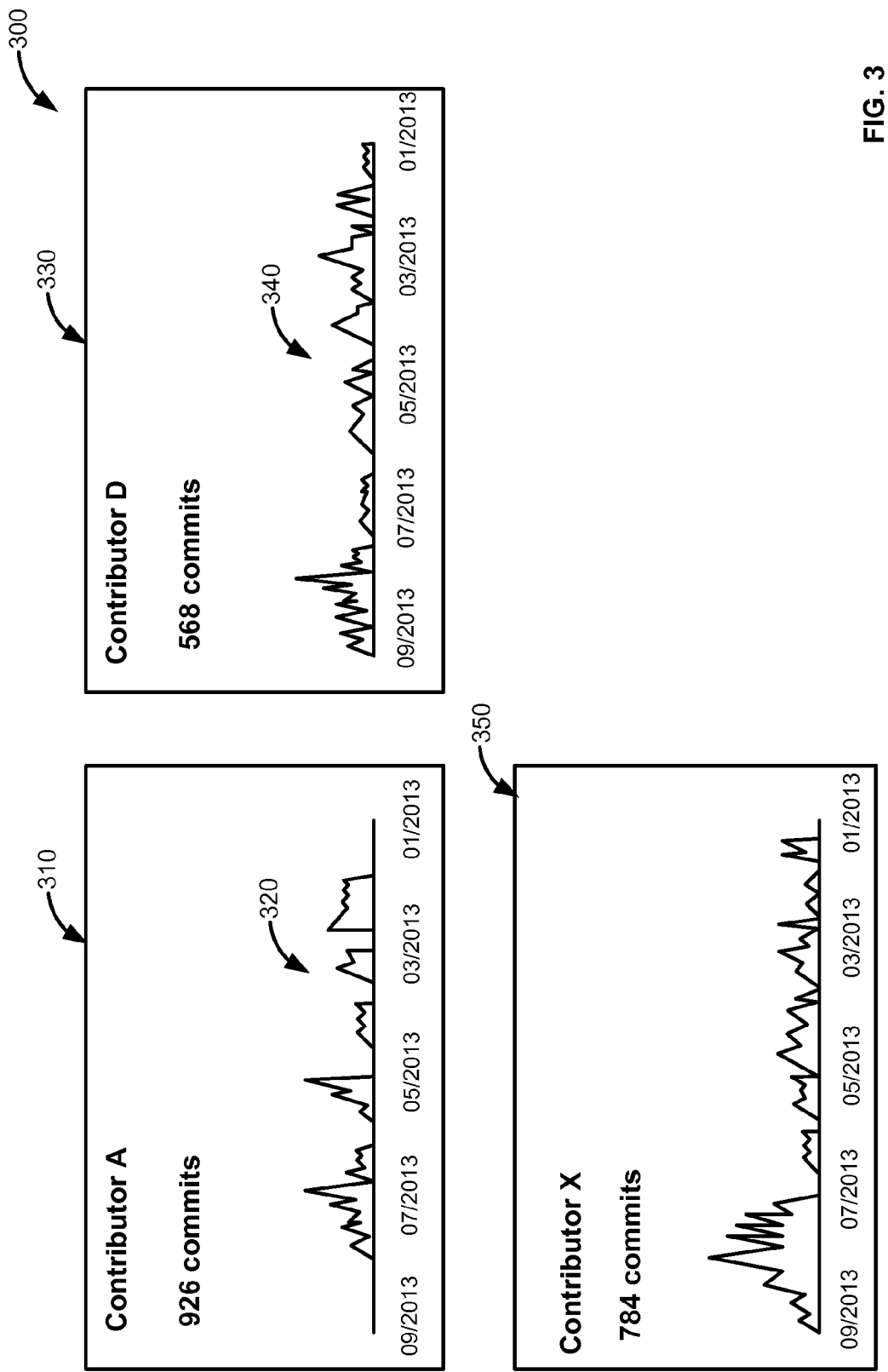
FIG. 3 illustrates a user interface of a version control system displaying a graph of summary of commits by contributors, according to one embodiment.

FIG. 3 illustrates user interface 300 of a version control system displaying a graph of summary of commits by contributors, according to one embodiment. Individual contributors working on 'project A' commit changes in various modules of 'project A'. User interface 300 displays a graphical representation of a summarized number of commits by individual contributors based on a selected timeframe. Window 310 shows '926 commits' by 'contributor A'. The '926 commits' by 'contributor A' is summarized based on month/year range and represented graphically as shown in graph 320. Based on the graph 'contributor A' has maximum number of commits in the time frame '07/2013' that is shown by a peak period in the graph, whereas 'contributor A' has minimum number of commits in the time frame '09/2013' and '01/2013'. Similarly, window 330 shows '568 commits' by 'contributor D'. The '568 commits' by 'contributor D' is summarized based on month/year range and represented graphically as shown in graph 340. Similarly, a graphical representation of summarized number of commits by other contributors such as 'contributor X' based on the selected timeframe is displayed in the user interface 300 as shown in 350.

Figure 4:
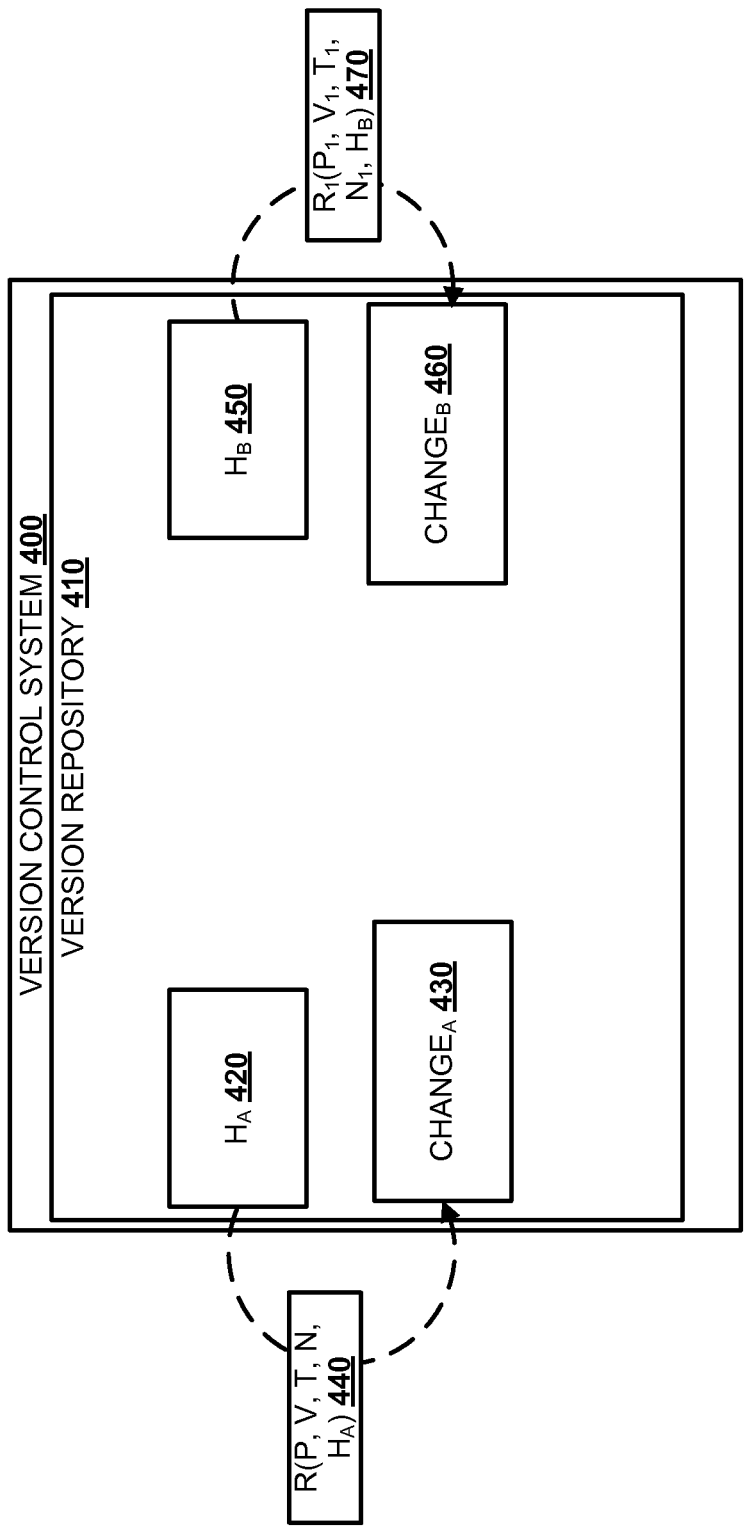
FIG. 4 illustrates a block diagram of changes committed in a version control system, according to one embodiment.

FIG. 4 illustrates block diagram of changes committed in a version control system 400, according to one embodiment. Consider an example of 'project A', where user 'user$_A$' commits change 'change$_A$' to version 'version$_A$' of software code in module 'module$_A$' at 'timestamp$_A$' moment in time. The change committed by 'user$_A$' is persisted in version repository 410 in version control system 400. A cryptographic hash value may be generated based on a set of parameters corresponding to a) 'user$_A$', b) 'version$_A$' and c) a nonce, e.g., 'nonce$_A$'. The set of parameters corresponding to a) 'user$_A$' includes a pointer to 'user$_A$' represented by 'P' that may be a user identifier (e.g., "userid") of 'user$_A$', a GUID (global user identifier of 'user$_A$'), etc. In this way, pointer to user identifier "userid" is not directly associated with the 'change$_A$'. The set of parameters corresponding to b) 'version$_A$' includes a number uniquely assigned by the version repository to 'version$_A$' represented by 'V', and the 'timestamp$_A$' at which the change was committed by 'user$_A$' represented by 'T'. The set of parameters corresponding to c) cryptographic nonce referred to as nonce is an arbitrary random number represented by 'N' that is used only one time. A cryptographic secure hash value represented by 'H' is generated based on the values of 'P', 'V', 'T' and 'N'. To generate cryptographic hash value, various cryptographic hash algorithms such as SHA-256, SHA-512, MD4, MD5, etc., can be used.

For the 'change$_A$' committed by 'user$_A$', a cryptographic hash value H$_A$ may be generated based on pointer 'P' to 'user$_A$', 'change$_A$' committed by 'user$_A$' in 'version$_A$' 'V', timestamp 'T' associated with the 'change$_A$' committed by 'user$_A$' and the 'nonce$_A$' 'N' generated for 'change$_A$' committed by 'user$_A$'. The computed value of H$_A$ may be persisted in the version repository 410 of the version control system 400. The computed cryptographic hash value H$_A$ 420 is stored along with 'change$_A$' 430 in version repository 410 in the version control system 400. The cryptographic hash value H$_A$ 420 is associated with the 'change$_A$' 430 by a redirection pointer. The redirection pointer may be a record 'R' or a tuple that includes values of 'P', 'V', 'T', 'N' and 'H$_A$' and is represented as R(P,V,T,N, H$_A$) as shown in 440. The redirection pointer may be stored in a database or repository separated from the version repository 410. Similarly, for the 'change$_B$' committed by 'user$_B$', a cryptographic hash value H$_B$ is generated based on pointer 'P$_1$' to 'user$_B$', 'change$_B$' committed by 'user$_B$' in 'version$_B$' 'V$_1$', timestamp 'T$_1$' associated with the 'change$_B$' committed by 'user$_B$' and a 'nonce$_B$' 'N$_1$' generated for 'change$_B$' committed by 'user$_B$'. The computed cryptographic hash value H$_B$ 450 may be stored along with 'change$_B$' 460 in version repository 410 in the version control system 400. The cryptographic hash value H$_B$ 450 is associated with the 'change$_B$' 460 by a redirection pointer R$_1$(P$_1$, V$_1$, T$_1$, N$_1$, H$_B$) 470 that may be stored in the database separated from the version repository 410. The redirection pointer R$_1$(P$_1$, V$_1$, T$_1$, N$_1$, H$_B$) 470 may be a record that includes values of 'P$_1$', 'V$_1$', 'T$_1$', 'N$_1$' and 'H$_B$'.

Figure 5:
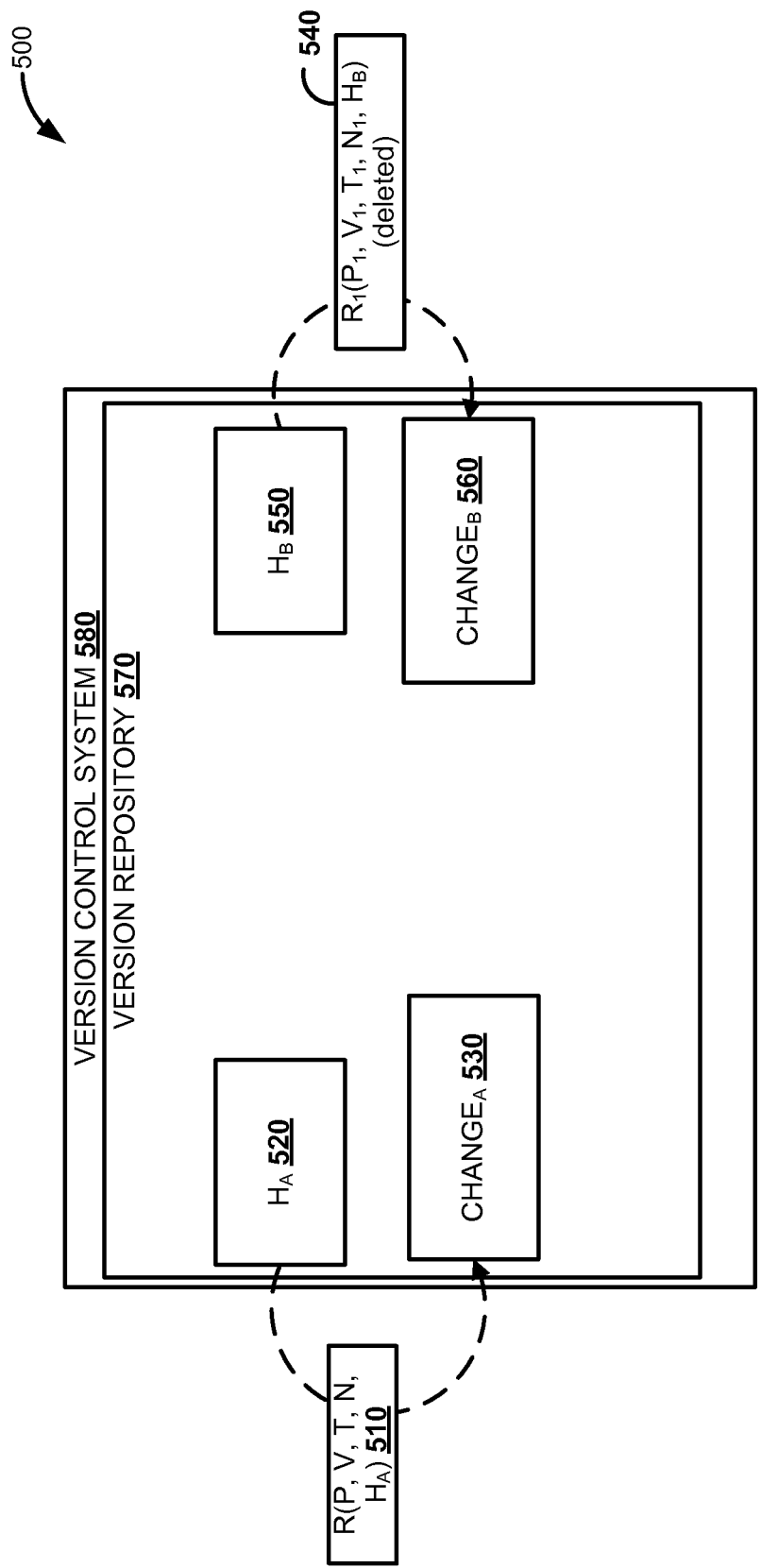
FIG. 5 illustrates a block diagram of disassociating a user from a change committed by a user in a version control system, according to one embodiment.

FIG. 5 illustrates block diagram 500 of disassociating a user from a change committed by the user in a version control system, according to one embodiment. Redirection pointer R(P,V,T,N, H$_A$) 510 associates cryptographic hash value H$_A$ 520 with 'change$_A$' 530. Redirection pointer R$_1$(P$_1$, V$_1$, T$_1$, N$_1$, H$_B$) 540 associates cryptographic hash value H$_B$ 550 with the 'change$_B$' 560. The cryptographic hash values H$_A$ 520 and H$_B$ 550, and the changes committed 'change$_A$' 530 and 'change$_B$' 560 are persisted in the version repository 570 in the version control system 580. If a requirement is received to dissociate the changes 'change$_B$' 560 committed by user 'user$_B$', the redirection pointer 540 associating H$_B$ 550 with 'change$_B$' 560 is deleted. When the redirection pointer R$_1$(P$_1$, V$_1$, T$_1$, N$_1$, H$_B$) 540 is deleted, hash value H$_B$ 550 is disassociated from the 'change$_B$' 560. Since the value of H$_B$ 550 persisted in the version repository 570 is not deleted, no change occurs in the version repository 570, thereby the data in the version repository 570 is protected. When the commits are displayed in the version control system, 'change$_B$' 560 is displayed without reference to 'user$_B$', whereas 'change$_A$' 530 is displayed with reference to 'user$_A$'.

Figure 6:
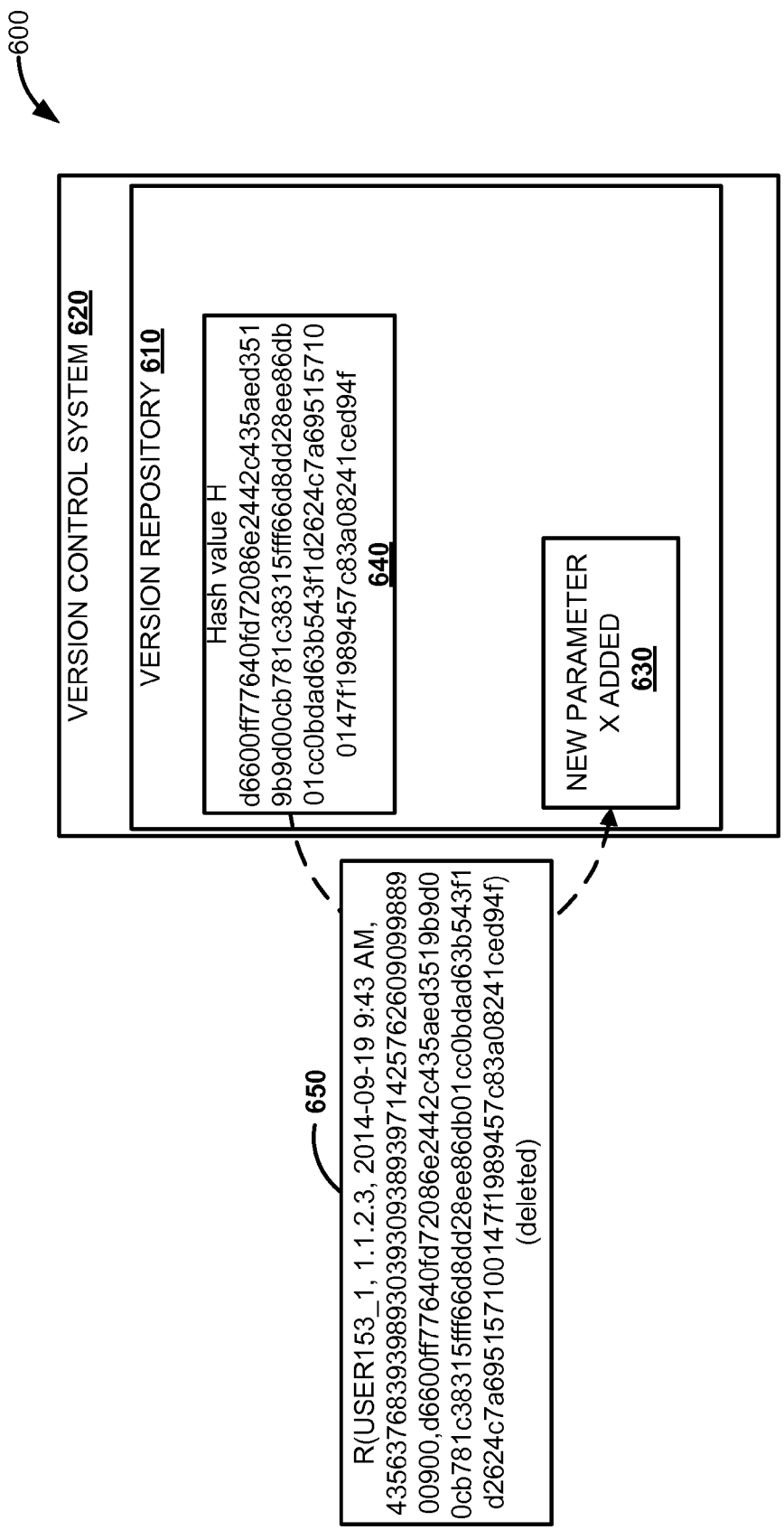
FIG. 6 illustrates a block diagram of committing a change in a version control system, according to one embodiment.

FIG. 6 illustrates block diagram 600 of committing a change in a version control system, according to one embodiment. Consider an example of 'project A', where 'user$_1$' commits 'change$_1$', namely 'new parameter X added' 630 to 'version$_1$' 1.1.2.3' of software development in 'module$_1$' at 'timestamp$_1$' '2014-09-19 9:43 AM'. The change committed by 'user$_1$' is persisted in a version repository 610 in version control system 620. A cryptographic hash value is generated based on a set of parameters corresponding to 'user$_1$', 'version$_1$' 1.1.2.3' and 'nonce$_1$'. The set of parameters corresponding to 'user$_1$' includes a pointer to 'user$_1$', e.g., a pointer to identifier of 'user$_1$' 'USER153_1', and this is represented by 'P'. The set of parameters corresponding to 'version$_1$' '1.1.2.3' includes a number uniquely assigned by the version repository to 'version$_1$' represented by 'V', and the 'timestamp$_1$' '2014-09-19 9:43 AM' represented by 'T' at which the change was committed by 'user$_1$'. 'Nonce$_1$' is an arbitrary random number, for example,
    '43563768393989303930938939714257626090998 8900900'
and is represented by 'N'. A cryptographic secure hash 'value H is generated based on the values of P, V, T and N. A cryptographic hash algorithm, e.g., SHA-512, may be used to generate the hash value H by substituting value of 'USER153_1' for 'P', '1.1.2.3' for 'V', '2014-09-19 9:43 AM' for 'T' and
'43563768393989303930938939714257626090998 8900900' for 'N' as
   H(USER153_1, 1.1.2.3, 2014-09-19 9:43 AM, 43563768393989303930938939714257626090 9988900900).
The Hash value H using SHA-512 algorithm is
   'd6600ff77640fd72086e2442c435aed3519b9d00c
     b781c38315fff66d8dd28ee86db
     01cc0bdad63b543f1d2624c7a695157100147f198
     9457c83a08241ced94f'
as shown in 640.

The 'change$_1$' committed 'new parameter X added' 630 and the cryptographic hash value
'd6600ff77640fd72086e2442c435aed3519b9d0
  cb781c38315fff66d8dd28ee86db
  01cc0bdad63b543f1d2624c7a695157100147f198
  9457c83a08241ced94f' 640
are associated with a redirection pointer 650. The redirection pointer
  R(USER153_1,  1.1.2.3,  2014-09-19  9:43  AM,
    43563768393989303930938939714257626090998
    8900900,
    d6600ff77640fd72086e2442c435aed3519b9d00
    cb781c38315fff66d8dd28ee86db0
    1cc0bdad63b543f1d2624c7a69515710014
    7f1989457c83a08241ced94f) 650
is stored separated from the version control system 620 or outside the version control system 620. At this point, 'change$_1$' committed in version control system 620 is associated with 'user$_1$' through the redirection pointer 650. The redirection pointer is an exclusive association between the 'user$_1$' and the 'change$_1$' committed by the 'user$_1$' based on the cryptographic hash value. When a business requirement or a legal requirement is received to delete the association or link between 'change$_1$' and 'user$_1$', the redirection pointer 650 is deleted. By deleting the redirection pointer
  R(USER153_1,  1.1.2.3,  2014-09-19  9:43  AM,
    43563768393989303930938939714257626090909
    988900900,
    d6600ff77640fd72086e2442c435aed3519b9d00c
    b781c38315fff66d8dd28ee86db0
    1cc0bdad63b543f1d2624c7a695157100147f1989
    457c83a08241ced94f) 650,
the value H 640 is still stored in the version control system 620 but the link between the value H 640 and 'user$_1$' is disassociated. Since the pointer to identifier of 'user$_1$' was not directly used to associate with 'change$_1$', there is no deletion of user details in the version repository 610, and no alteration of the version repository occurs. Since the pointer to identifier of 'user$_1$' along with an arbitrary random number 'nonce$_1$' is used in a secure cryptographic hash function, to direct the redirection pointer to a different user, a new pointer to the identifier of the different user has to be computed while retaining the value of H 640. To compute the new pointer to the identifier of different user while retaining the value of H 640 the identical 'nonce$_1$' has to be determined. Determining the identical 'nonce$_1$' is practically infeasible, and the redirection pointer is unchangeable or cannot be changed or tampered. In one embodiment, the values of P, V, T, N and cryptographic hash value H may be stored and secured in a different database or in a protected area of version control system that restricts access such as read access and write access to users.

Figure 7:
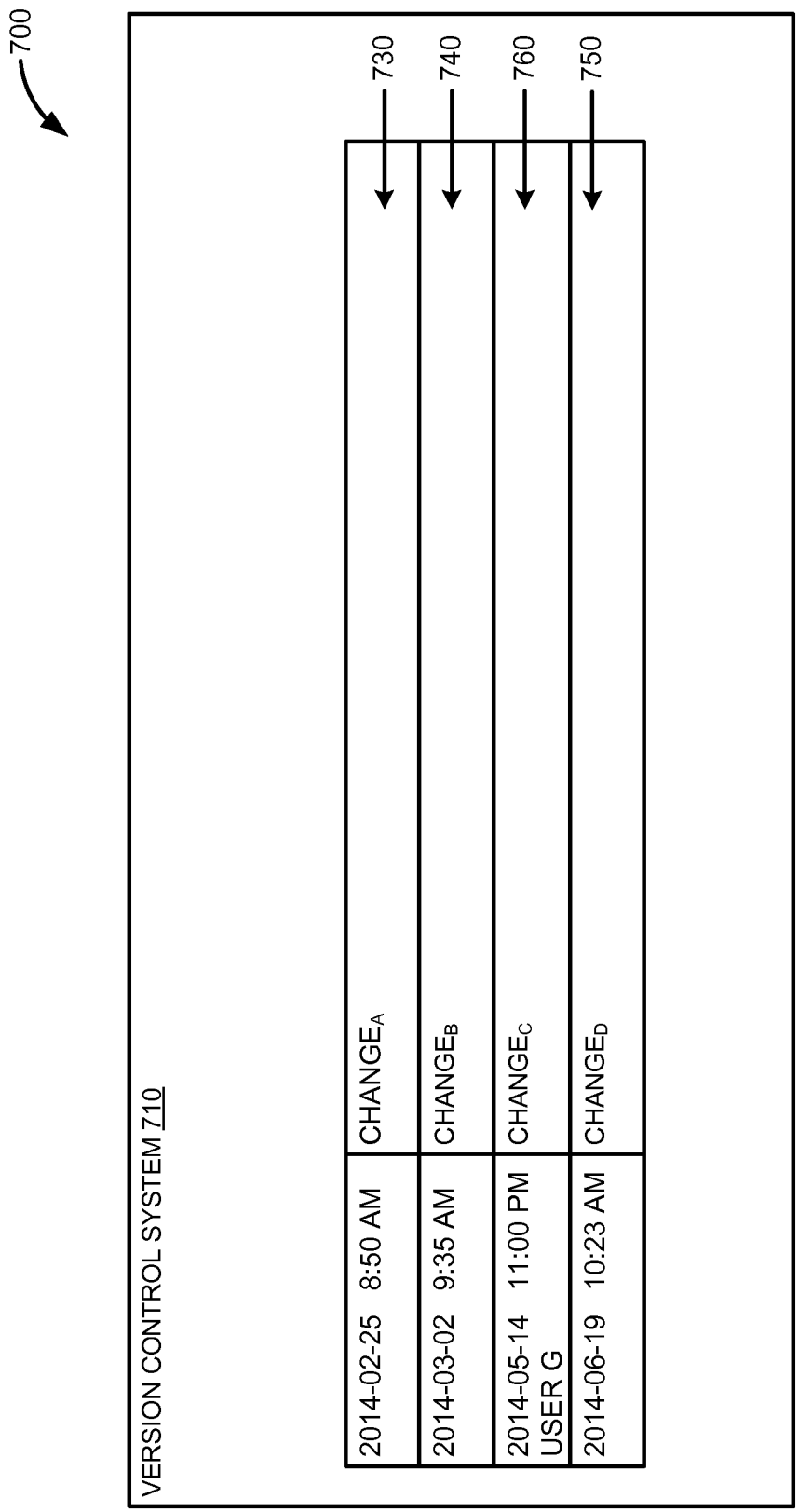
FIG. 7 illustrates a user interface of a version control system displaying changes committed by users, according to one embodiment.

FIG. 7 illustrates user interface 700 of a version control system 710 displaying changes committed by users, according to one embodiment. Consider a scenario where change 'change$_A$' is committed to a version repository by 'user X' at a time stamp '2014-02-25 8:50 AM', change 'change$_B$' is committed to the version repository by 'user W' at a time stamp '2014-03-02 9:35 AM', change 'change$_C$' is committed to the version repository by 'user G' at a time stamp '2014-05-14 11:00 PM', and change 'change$_D$' is committed to the version repository by 'user Q' at a time stamp '2014-06-19 10:23'. When a business requirement is received to delete the association or link between 'user X' and 'change$_A$', a redirection pointer associating a hash value generated based on a set of parameters corresponding to 'user X', version where 'change$_A$' occurred and a nonce, is deleted to disassociate 'user X' and 'change$_A$'. Accordingly, in a report in the user interface 700 of the version control system, 'change$_A$' is displayed along with the time stamp '2014-02-25 8:50 AM' without displaying 'user X' as shown in 730. Similarly, 'change$_B$' is displayed along with time stamp '2014-03-02 9:35 AM' without displaying 'user W' as shown in 740, and 'change$_D$' is displayed along with time stamp '2014-06-19 10:23 AM' without displaying 'user Q' as shown in 750. When no business requirement is received to delete the link between 'user W' and 'change$_C$', 'change$_C$' is displayed along with time stamp '2014-05-14 11:00 PM' and user information 'user G' as shown in 760.

Figure 8:
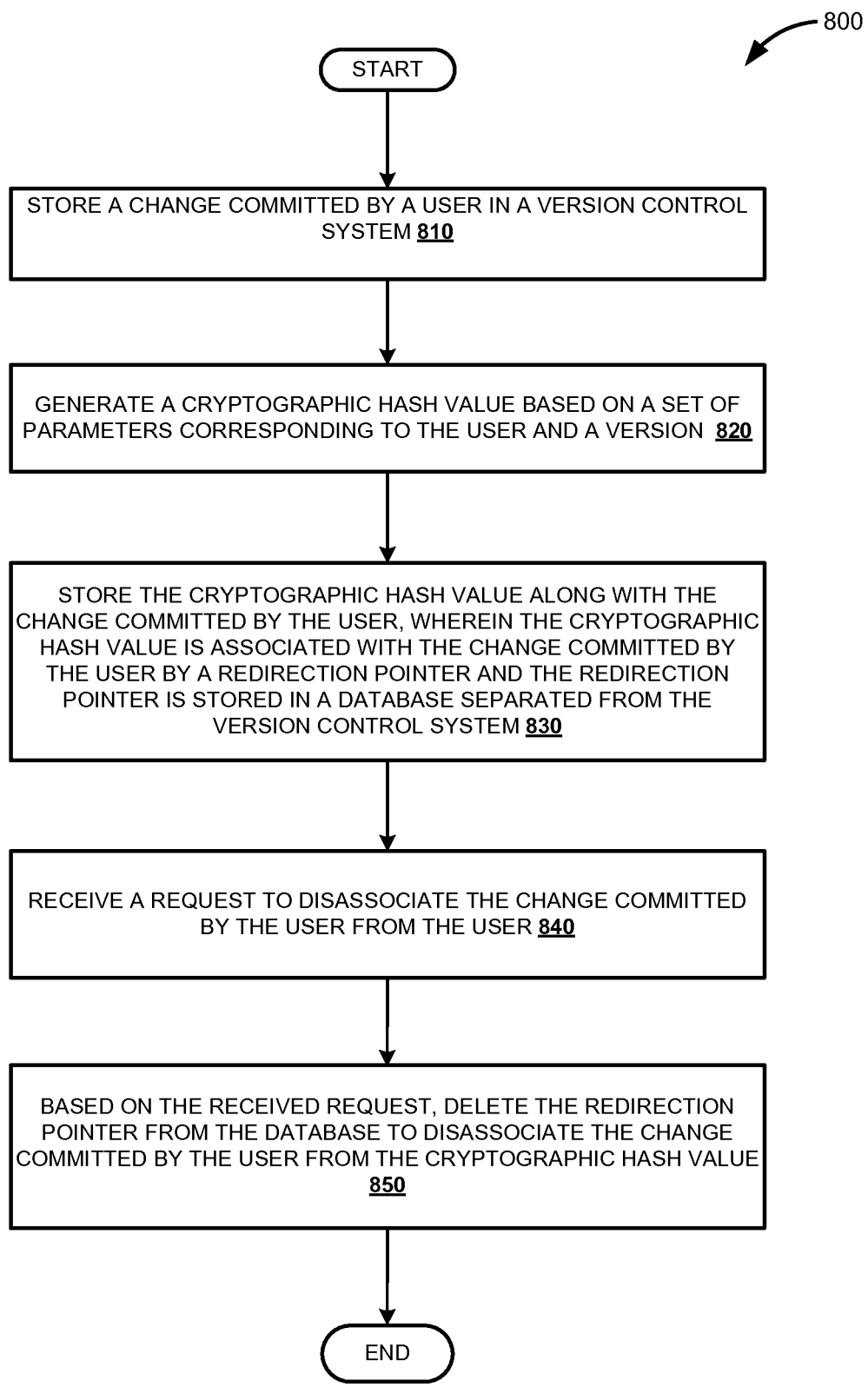
FIG. 8 is a flow diagram illustrating a process of data protection compliant version control, according to one embodiment.

FIG. 8 is a flow diagram illustrating process 800 of data protection compliant version control, according to one embodiment. At 810, a change committed by a user in a version control system is stored. At 820, a cryptographic hash value is generated based on a set of parameters corresponding to the user and a version. At 830, the cryptographic hash value along with the change committed by the user is stored. The cryptographic hash value is associated with the change committed by the user by a redirection pointer. The redirection pointer is stored in a database separated from the version control system. At 840, a request is received to disassociate the change committed by the user from the user. At 850, based on the received request, the redirection pointer is deleted from the database to disassociate the change committed by the user from the cryptographic hash value.

The various embodiments described above have a number of advantages. Selective deletion of link associating a user and a change made by the user is possible in the version control system. Since the pointer to identifier of user is not directly used to associate with the change, deletion of user details does not happen in the version repository, and no alteration of the version repository occurs. Since the pointer to identifier of user is used along with an arbitrary random number nonce in generation of a secure cryptographic hash function, it is impossible to redirect the redirection pointer to a different user as computing the identical nonce is practically infeasible. Therefore, it is not possible to tamper the details of user responsible for the changes. The redirection pointer is unchangeable or untamperable to be associated with any other user.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
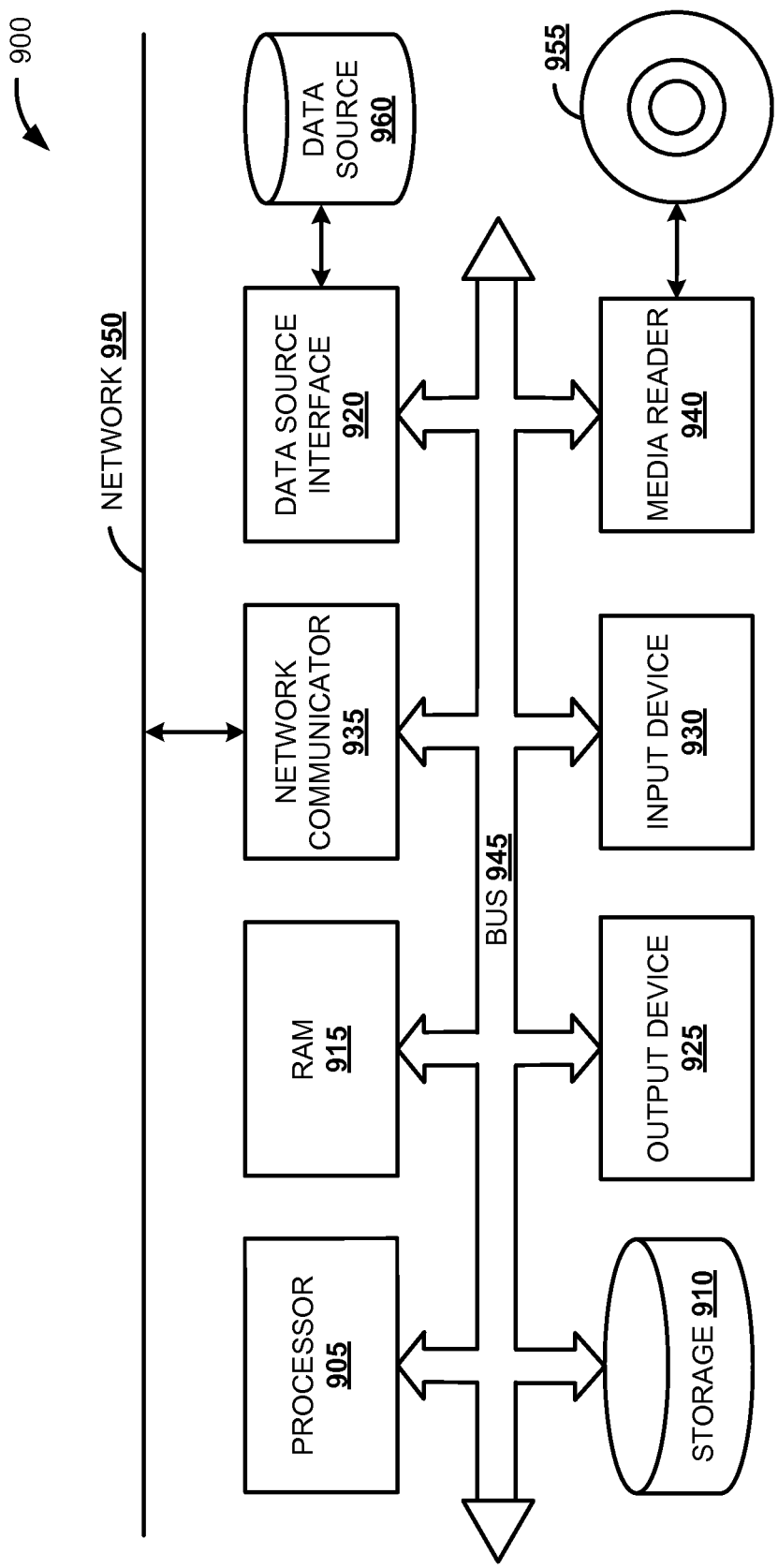
FIG. 9 is a block diagram illustrating an exemplary computer system, according to one embodiment

FIG. 9 is a block diagram illustrating an exemplary computer system, according to one embodiment. The computer system 900 includes a processor 905 that executes software instructions or code stored on a computer readable storage medium 955 to perform the above-illustrated methods. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. One or more of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   store a change committed by a user in a version control system;
   generate a cryptographic hash value based on a set of parameters corresponding to the user and a version;
   store the cryptographic hash value along with the change committed by the user, wherein the cryptographic hash value is associated with the change committed by the user by a redirection pointer, and the redirection pointer is stored in a database separated from the version control system;
   receive a request to disassociate the change committed by the user from the user;
   based on the received request, delete the redirection pointer from the database to disassociate the change committed by the user from the cryptographic hash value.

2. The computer-readable medium of claim 1, wherein the set of parameters corresponding to the user comprise a pointer to an identifier of the user.

3. The computer-readable medium of claim 2, wherein generating the cryptographic hash value is based on the pointer to the identifier of the user, the version, a timestamp associated with the change, and a cryptographic nonce.

4. The computer-readable medium of claim 3, wherein the redirection pointer is a record comprising the pointer to the identifier of the user, the version, the timestamp associated with the change, the cryptographic nonce, and the cryptographic hash value.

5. The computer-readable medium of claim 1, wherein the redirection pointer is an exclusive association between the user and the change committed by the user based on the cryptographic hash value.

6. The computer-readable medium of claim 1, further comprising instructions which when executed by the computer further causes the computer to:
  display the change committed by the user in a user interface associated with the version control system.

7. The computer-readable medium of claim 6, wherein the display further comprising instructions which when executed by the computer further causes the computer to:
  display the change committed to the version control system without the user responsible for the change when the redirection pointer is deleted.

8. A computer-implemented method for data protection compliant version control, the method comprising:
  storing a change committed by a user in a version control system;
  generating a cryptographic hash value based on a set of parameters corresponding to the user and a version;
  storing the cryptographic hash value along with the change committed by the user, wherein the cryptographic hash value is associated with the change committed by the user by a redirection pointer, and the redirection pointer is stored in a database separated from the version control system;
  receiving a request to disassociate the change committed by the user from the user;
  based on the received request, deleting the redirection pointer from the database to disassociate the change committed by the user from the cryptographic hash value.

9. The method of claim 8, wherein the set of parameters corresponding to the user comprise a pointer to an identifier of the user.

10. The method of claim 9, wherein generating the cryptographic hash value is based on the pointer to the identifier of the user, the version, a timestamp associated with the change, and a cryptographic nonce.

11. The method of claim 10, wherein the redirection pointer is a record comprising the pointer to the identifier of the user, the version, the timestamp associated with the change, the cryptographic nonce, and the cryptographic hash value.

12. The method of claim 8, wherein the redirection pointer is an exclusive association between the user and the change committed by the user based on the cryptographic hash value.

13. The method of claim 8, further comprising instructions which when executed by the computer further causes the computer to:
  displaying the change committed by the user in a user interface associated with the version control system.

14. The method of claim 13, wherein the display further comprising instructions which when executed by the computer further causes the computer to:
  displaying the change committed to the version control system without the user responsible for the change when the redirection pointer is deleted.

15. A computer system for data protection compliant version control, comprising:
  a computer memory to store program code; and
  a processor to execute the program code to:
  store a change committed by a user in a version control system;
  generate a cryptographic hash value based on a set of parameters corresponding to the user and a version;
  store the cryptographic hash value along with the change committed by the user, wherein the cryptographic hash value is associated with the change committed by the user by a redirection pointer, and the redirection pointer is stored in a database separated from the version control system;
  receive a request to disassociate the change committed by the user from the user;
  based on the received request, delete the redirection pointer from the database to disassociate the change committed by the user from the cryptographic hash value.

16. The system of claim 15, wherein the set of parameters corresponding to the user comprise a pointer to an identifier of the user.

17. The system of claim 16, wherein generating the cryptographic hash value is based on the pointer to the identifier of the user, the version, a timestamp associated with the change, and a cryptographic nonce.

18. The system of claim 17, wherein the redirection pointer is a record comprising the pointer to the identifier of the user, the version, the timestamp associated with the change, the cryptographic nonce, and the cryptographic hash value.

19. The system of claim 15, further comprising instructions which when executed by the computer further causes the computer to:
  display the change committed by the user in a user interface associated with the version control system.

20. The system of claim 19, wherein the display further comprising instructions which when executed by the computer further causes the computer to:
  report the change committed to the version control system without the user responsible for the change when the redirection pointer is deleted.

* * * * *